United States Patent [19]
Reed, Jr. et al.

[11] Patent Number: 6,012,561
[45] Date of Patent: Jan. 11, 2000

[54] DUAL CLUTCH DESIGN FOR AND ELECTRO-MECHANICAL AUTOMATIC TRANSMISSION HAVING A DUAL INPUT SHAFT

[75] Inventors: Richard G. Reed, Jr., Royal Oak; Donald L. Carriere, Livonia, both of Mich.

[73] Assignee: Chrysler Corporation, Auburn Hills, Mich.

[21] Appl. No.: 09/153,424

[22] Filed: Sep. 15, 1998

[51] Int. Cl.[7] ........................................... F16D 21/06
[52] U.S. Cl. ................. 192/48.2; 192/48.91; 192/70.29; 192/90
[58] Field of Search ................... 192/48.2, 48.7, 192/48.8, 48.91, 70.27, 70.29, 40, 90, 84.6

[56] References Cited

U.S. PATENT DOCUMENTS

| | | | |
|---|---|---|---|
| 2,237,322 | 4/1941 | West | 192/48.8 |
| 3,018,863 | 1/1962 | Elfes | 192/48.7 |
| 3,212,611 | 10/1965 | Ruoff et al. | 192/48.8 |
| 3,749,213 | 7/1973 | Maucher | 192/48.8 |
| 4,210,232 | 7/1980 | Beccaris | 192/48.8 |
| 4,465,170 | 8/1984 | Marchisio | 192/48.7 |
| 4,561,322 | 12/1985 | Hausinger . | |
| 4,714,147 | 12/1987 | Szodfridt et al. . | |
| 4,771,648 | 9/1988 | Bardoll . | |
| 4,787,492 | 11/1988 | Ball et al. | 192/48.8 |
| 4,865,173 | 9/1989 | Leigh-Monstevens et al. | 192/90 X |
| 5,018,404 | 5/1991 | Müller . | |
| 5,125,282 | 6/1992 | Bender et al. . | |
| 5,353,902 | 10/1994 | Flotow et al. | 192/90 X |
| 5,363,712 | 11/1994 | Müller . | |
| 5,365,800 | 11/1994 | Müller . | |
| 5,392,665 | 2/1995 | Müller . | |
| 5,474,505 | 12/1995 | Seidel et al. . | |
| 5,513,734 | 5/1996 | Scotti | 192/70.27 |
| 5,640,882 | 6/1997 | Mueller . | |
| 5,678,669 | 10/1997 | Rainer | 192/48.8 |

*Primary Examiner*—Richard M. Lorence
*Attorney, Agent, or Firm*—Jennifer M. Stec

[57] ABSTRACT

A dual clutch system is provided for a transmission having dual input shafts. The dual clutch system includes first and second flywheels as well as first and second friction disk assemblies and first and second pressure plates for pressing against said first and second friction disk assemblies, respectively. The pressure plates are each operatively engaged by an electromechanical clutch actuator.

5 Claims, 13 Drawing Sheets

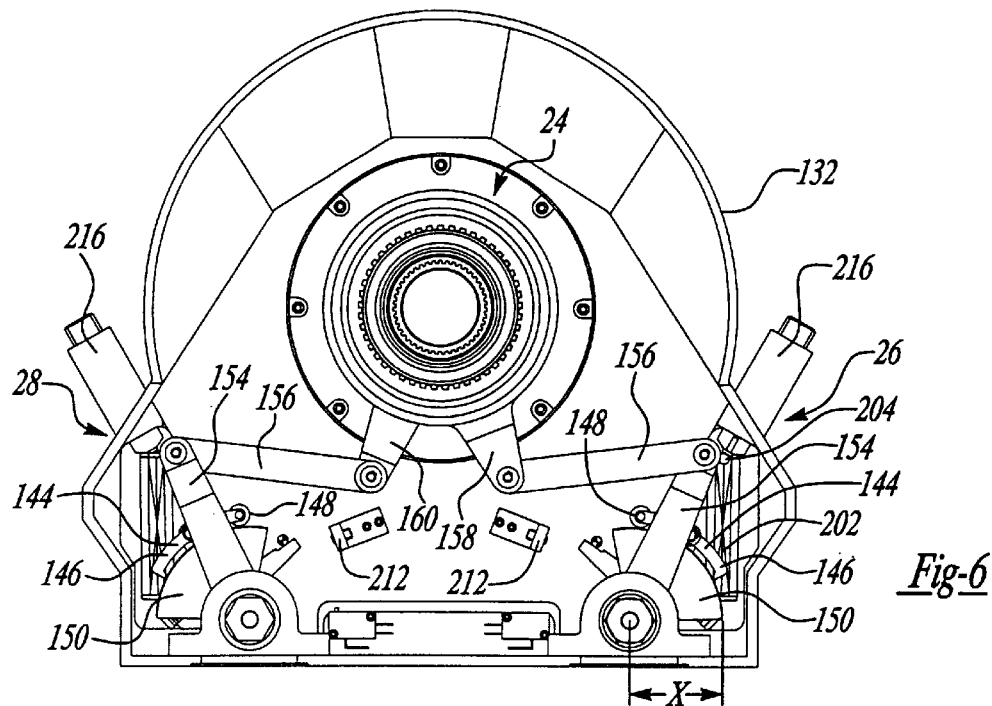
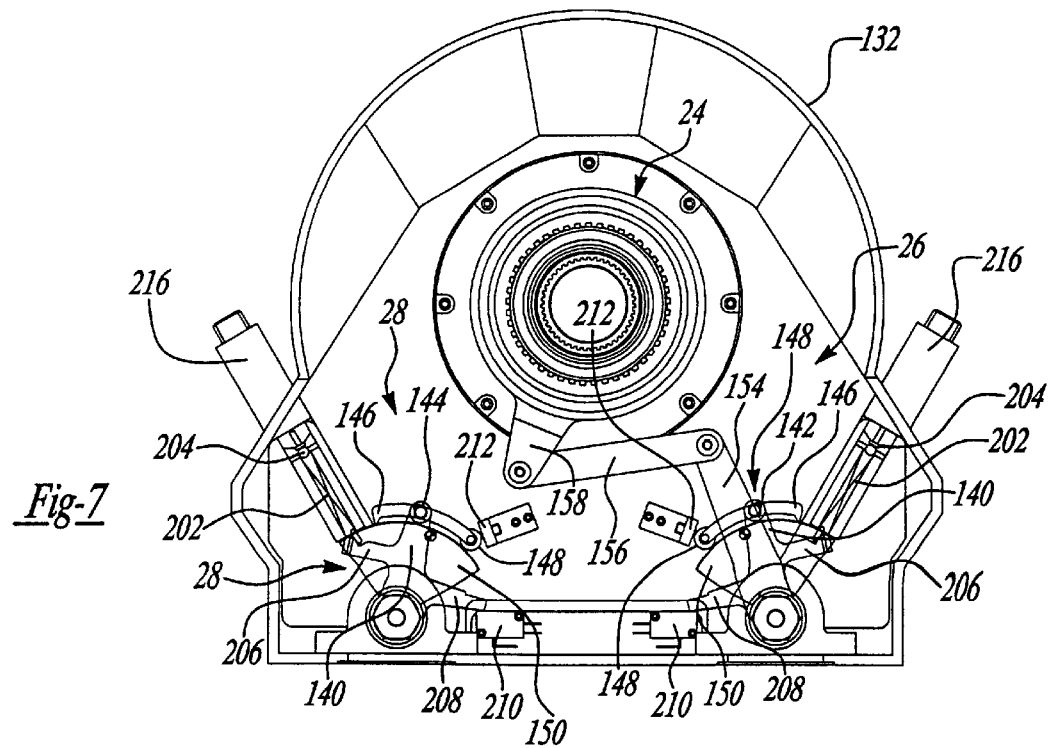

DUAL CLUTCH DESIGN FOR AND ELECTRO-MECHANICAL AUTOMATIC TRANSMISSION HAVING A DUAL INPUT SHAFT

BACKGROUND OF THE INVENTION

FIELD OF THE INVENTION

The present invention relates to an automatic transmission, and more particularly, a dual clutch design for an electromechanical automatic transmission having a dual input shaft.

BACKGROUND AND SUMMARY OF THE INVENTION

There are presently two typical power transmissions in use on the conventional automobile. The first, and oldest, type of powertrain is the manually operated powertrain. These powertrains are typically characterized in that vehicles having manual transmissions include a clutch pedal to the left of a brake pedal and a gear shift lever which is usually mounted at the center of the vehicle just behind the dashboard. To operate the manual transmission, the driver must coordinate depression of the clutch and accelerator pedals with the position of the shift lever in order to select the desired gear. Proper operation of a manual transmission is well known to those skilled in the art, and will not be described further herein.

In a vehicle having an automatic transmission, no clutch pedal is necessary. The standard H configuration of the shift lever is replaced by a shift lever which typically moves back and forth. The driver need only select between park, reverse, neutral, drive, and one or two low gears. As is commonly known in the art, the shift lever is placed in one of several positions having the designator P, R, N, D, 2, and maybe 1 which corresponds to Park, Reverse, Neutral, Drive, and one or two low gears, respectively. Vehicle operation when the gear shift lever is placed in one of these positions in well known in the art. In particular, when in the drive mode, the transmission automatically selects between the available forward gears. As is well known, older systems typically included first, second and third gears, while newer systems include first through third gears as well as fourth and possibly a fifth and sixth overdrive gear. The overdrive gears provide an improved fuel economy at higher speeds.

As is well known, early transmissions were almost exclusively manually operated transmissions. With a steady development of automatic transmissions, drivers increasingly gravitated toward the easy operation of automatic transmissions. However, in the mid 1970s, rising concerns about present and future fossil fuel shortages resulted in an implementation of corporation average fuel economy regulations propagated in several countries. These fuel economy requirements necessitated the investigation of increasing the fuel economy of motor vehicles in order to meet government regulations. These government regulations prompted a gradual return to manual transmissions which are typically more efficient than automatic transmissions.

In the ensuing years, many mechanically operated vehicle systems were replaced or at least controlled by electronic control systems. These electronic control systems greatly increased the fuel efficiency of vehicle engines and enabled a gradual return to the convenience of automatic transmissions. In addition, electronic controls used with automatic transmissions, greatly improved the shift schedule and shift feel of automatic transmissions and also enabled implementation of fourth and fifth overdrive gears thereby increasing fuel economy. Thus, automatic transmissions have once again become increasingly popular.

Automatic and manual transmission offer various competing advantages and disadvantages. As mentioned previously, a primary advantage of a manual transmission is improved fuel economy. Conversely, automatic transmissions first and foremost offer easy operation, so that the driver need not burden both hands, one for the steering wheel and one for the gear shifter, and both feet, one for the clutch and one for the accelerator and brake pedal, while driving. When operating a manual transmission, the driver has both one hand and one foot free. In addition, an automatic transmission provides extreme convenience in stop and go situations, as the driver need not worry about continuously shifting gears to adjust to the everchanging speed of traffic.

The primary reason for the superior efficiency of the manual transmission over the automatic transmission lies in the basic operation of the automatic transmission. In most automatic transmissions, the output of the engine connects to the input of the transmission through a torque converter. Most torque converters have an input impeller that is connected to the output shaft of the engine and an input turbine that is connected to the input shaft of the transmission. Movement of the impeller at the input side results in a hydraulic fluid flow which causes a corresponding movement of the hydraulic turbine connected to the input shaft of the transmission. While torque converters provide a smooth coupling between the engine and the transmission, the slippage of the torque converter results in a parasitic loss, thereby decreasing the efficiency of the powertrain. Further, the shift operation in an automatic transmission requires a hydraulic pump which pressurizes a fluid for clutch engagement. The power required to pressurize the fluid introduces additional parasitic losses of efficiency in the powertrain.

Before a shift between the gear ratios of a manual transmission can occur, it is necessary to synchronize the rotational speed of the driveshaft with the rotational speed of the driven shaft. Typically, synchronization is obtained in a manual transmission by way of a synchronizing mechanism such as a mechanical synchronizer which is well known in the art. The mechanical synchronizer varies the speed of the driveshaft to match the speed of the driven shaft to enable smooth engagement of the selected gear set. For example, during an upshift, the mechanical synchronizer utilizes frictional forces to decrease the rate of rotation of the driveshaft so that the desired gear of the driveshaft is engaged smoothly to drive the desired gear of the driven shaft. Conversely, during a downshift, the mechanical synchronizer increases the rate of rotation of the driveshaft so that the desired gear is engaged smoothly to drive the desired gear on the driven shaft. Typically, with a manual transmission, there is a delay period between disengagement of the currently engaged gear and the subsequent synchronization and engagement of the desired transmission gear. Also, during this process, the clutch connection between the engine output shaft and the transmission input shaft needs to be disengaged prior to the gear shifting process and reengaged upon synchronization.

Thus, it is an object of the present invention to provide an electromechanical automatic transmission which utilizes the manual-type transmission design in order to eliminate the parasitic losses associated with the torque converter and the hydraulic controls of conventional automatic transmissions. The electromechanical automatic transmission of the present invention is essentially an automated manual transmission. The design utilizes a dual clutch/dual input shaft layout. The layout is the equivalent of having two transmissions in one housing. Each transmission can be shifted and clutched independently. Uninterrupted power upshifting and downshifting between gears is available along with the high mechanical efficiency of a manual transmission being available in an automatic transmission. Significant increases in fuel economy and vehicle performance are achieved.

Two independently acting electromechanical shift actuators are provided with barrel-shaped cam members to shift conventional manual synchronizers with the clutches and blocker rings.

The dual clutch system consists of two dry discs driven by a common flywheel assembly. Two electromechanical clutch actuators are provided to control disengagement of the two-clutch discs independently. Shifts are accomplished by engaging the desired gear prior to a shift event and subsequently engaging the corresponding clutch. The clutch actuators have assist springs to reduce the power needed to disengage the clutches. The actuators also have compensation mechanisms to automatically adjust for clutch disc wear over the life of the clutch discs.

The transmission of the present invention can be in two different gear ratios at once, but only one clutch will be engaged and transmitting power. To shift to the new gear ratio, the driving clutch will be released and the released clutch will be engaged. The two-clutch actuators perform a quick and smooth shift as directed by an on-board vehicle control system using close-dloop control reading engine RPMs or torque. The transmission shaft that is disengaged will then be shifted into the next gear ratio in anticipation of the next shift.

A hill holder mechanism is provided in the form of an engagable overrunning one-way roller clutch. This clutch will be engaged when the transmission is in first, second, or third gears in order to prevent vehicle rollback on a hill. A series of four synchronizer pairs are preferably used on the two input shafts. The hill holder mechanism is selectively engaged by one of the synchronizers. The hill holder prevents rollback of the vehicle when it is stopped. Contrary to an automatic transmission, there is no engine torque required to hold the vehicle from rolling back on a grade, thus efficiency is improved.

A lubrication system is provided such that a center plate is provided within the transmission housing for supporting an end of one of the two input shafts and also supports a lubrication pump mechanism which is driven by a reverse idler gear also mounted to the center plate. The lubrication pump mechanism draws lubrication fluid from the bottom of the transmission housing, through fluid passages in the center plate, and delivers the lubrication fluid to a center fluid passage disposed within the first input shaft. The center first input shaft, as well as the hollow second input shaft, are provided with radial fluid passages which communicate lubrication to each of the gears mounted on each of the first and second input shafts. Efficiency is increased when the oil level is below the geartrain, thus reducing parasitic drag (windage loss).

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2A is an illustration of the 2-4-6, hill holder cam profile;

FIG. 2B is an illustration of the R-1-3-5 cam profile;

FIG. 5 is an end view of the dual clutch assembly according to the principles of the present invention;

FIG. 6 is an end view of the clutch actuator assembly and dual cam assembly according to the principles of the present invention with each of the clutch actuator assemblies in the disengaged position;

FIG. 7 is an end view of the clutch actuator and dual cam assembly as shown in FIG. 6, with the right side clutch actuator in the disengaged position;

DETAILED DESCRIPTION OF THE PREFERRED EMBODIMENTS

Figure 1:
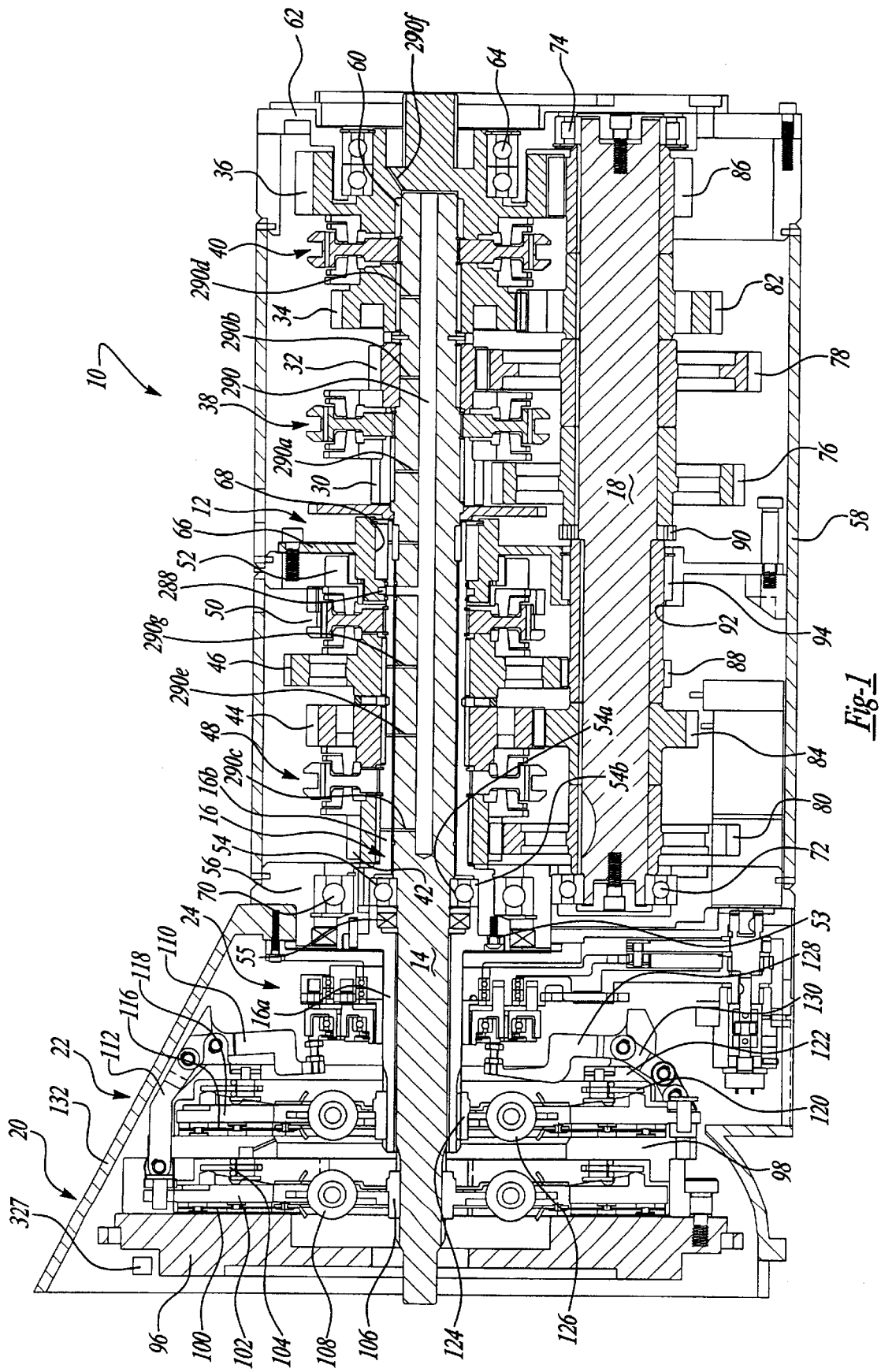
FIG. 1 is a sectional view of the electromechanical automatic transmission according to the principles of the present invention.

With reference to the accompanying drawings, the electromechanical automatic transmission 10, according to the principles of the present invention, will now be described. The electromechanical automatic transmission 10 is provided with a gear train 12 which includes a first input shaft 14 and a second hollow input shaft 16 which is concentric with the first input shaft 14. Each of the input shafts 14, 16 support a plurality of rotatably mounted drive gears which are engaged with respective driven gears mounted to a driven shaft 18. A first fricton clutch 20 is provided for transmitting torque from the engine output shaft (not shown) to the first input shaft 14. A second friction clutch 22 is provided for transmitting drive torque from the engine output shaft to the second input shaft 16. A dual cam assembly 24, along with first and second clutch actuators 26, 28 (see FIGS. 3–4 and 6–10) are provided for selectively disengaging the first and second friction clutches 20, 22.

The gear train 12 includes a reverse 30, first 32, third 34, and fifth 36 speed gears rotatably mounted to the first input shaft 14. A reverse-first synchronizer device 38 is provided for selectively engaging the reverse gear 30 and first speed gear 32 to the first input shaft 14. A third-fifth synchronizer device 40 is provided for selectively engaging the third and fifth speed gears 34, 36 to the first input shaft 14. Second 42, fourth 44, and sixth 46 speed gears are rotatably mounted to the second input shaft 16. A second-fourth synchronizer device 48 is provided for selectively engaging the second and fourth speed gears, 42, 44, respectively to the second input shaft 16. A sixth speed/hill holder synchronizer device 50 is provided for selectively engaging the sixth speed gear 46 to the second input shaft 16. In addition, the sixth speed/hill holder synchronizer 50 also engages an overrunning one-way clutch (Hill Holder) device 52 for preventing the vehicle from rolling backward down a hill.

The first input shaft 14 is supported by a bearing assembly 54. Bearing assembly 54 has an inner race 54a supported on the first input shaft 14 and an outer race 54b supported on the second input shaft 16. The second input shaft 16 includes a two-piece construction with a first shaft portion 16A and a second shaft portion 16B, each fastened together by a plurality of fasteners and/or pins 53 generally in the vicinity of the bearing 54. In addition, a seal 55 is provided between the first shaft portion 16A of the second input shaft 16 and the first input shaft 14. At a second end, the first input shaft 14 is supported by a needle bearing assembly 60 disposed within a central hub portion of fifth speed gear 36. Fifth speed gear 36 is supported by the end plate 62 via a bearing assembly 64. A center plate 66 is provided within the housing 58 and is provided with an opening 68 through which the first and second input shafts 14, 16 extend. The second input shaft 16 is supported within a front plate 56 of the transmission housing 58 via a bearing assembly 70 which is generally concentric with bearing 54. The driven shaft 18 is supported at a front end by the front plate 56 via a bearing assembly 72 and at a rear end by the end plate 62 via a bearing assembly 74. The driven shaft 18 is provided with a reverse driven gear 76, a first speed driven gear 78, a second speed driven gear 80, a third speed driven gear 82, a fourth speed driven gear 84, a fifth speed driven gear 86, a sixth speed driven gear 88, and a parking gear 90. The driven shaft 18 extends through an opening 92 in center plate 66 and is supported by needle bearing assembly 94.

The first input shaft 14 is drivingly engaged with the engine output shaft via first clutch 20, while second input shaft 16 is engaged with the engine output shaft via second clutch 22. The first and second clutches 20, 22 include a flywheel assembly including a first flywheel 96 which is mounted to the engine output shaft (not shown). A second flywheel 98 is mounted to the first flywheel 96 for rotation therewith. The first clutch 20 includes a friction plate 100 disposed between the first flywheel 96 and a pressure plate 102. Pressure plate 102 is biased by a belleville spring 104 into a normally engaged position. The friction plate 100 is engaged with a hub portion 106 which is mounted to the first input shaft 14 via a spline connection. A torsion spring system 108 is provided between the friction plate and the hub 106, as is well known in the art. A plurality of levers 110 engange the dual cam assembly 24 and are attached to linkages 112 which are attached to the pressure plate 102 for disengaging the pressure plate 102 from the friction plate 100 in order to disengage the first clutch 20 upon actuation of the clutch actuator 28 and dual cam assembly 24. Levers 110 pivot about pivots 113 which are attached to the clutch cover plate 122. Linkages 112 are attached to the levers 110 by a pivot 114 and to the pressure plate 102 at pivot 115. As the levers 110 are pivoted about pivots 113 by the dual cam assembly 24, linkages 112 are pulled in a direction away from the first flywheel 96', thereby disengaging the first clutch 20.

The second clutch 22 similarly includes a friction plate 116 which is disposed between the second flywheel 98 and a pressure plate 118. A belleville spring 120 is provided between the pressure plate 118 and a clutch cover plate 122. The second clutch 22 includes a hub 124 which is connected to the second input shaft 16 by a spline connection. The friction plate 116 is connected to the hub 124 via a torsion spring assembly 126, as is known in the art. A plurality of disengagement levers 128 engage the dual cam assembly 24 and are attached to a plurality of linkages 130 and are operable in order to disengage the second clutch 22. The disengagement levers 128 pivot about pivots 129 which are attached to the clutch cover plate 122. Linkages 130 are attached to the levers 128 by a pivot 131 and to the pressure plate 118 at pivot 133. As the levers 128 are pivoted about pivots 129 by the dual cam assembly 24, the linkages 130 are pulled in a direction away from the second flywheel 98 thereby disengaging the second clutch 22.

Figure 3:
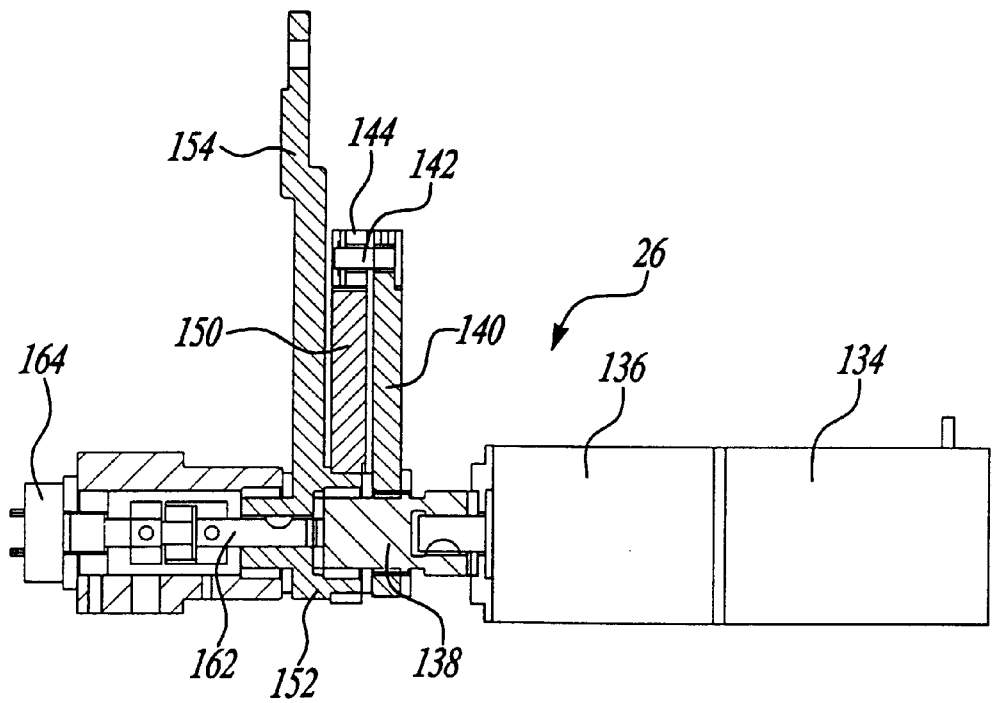
FIG. 3 is a side view of the R-1-3-5 side clutch actuator according to the present invention.
Figure 4:
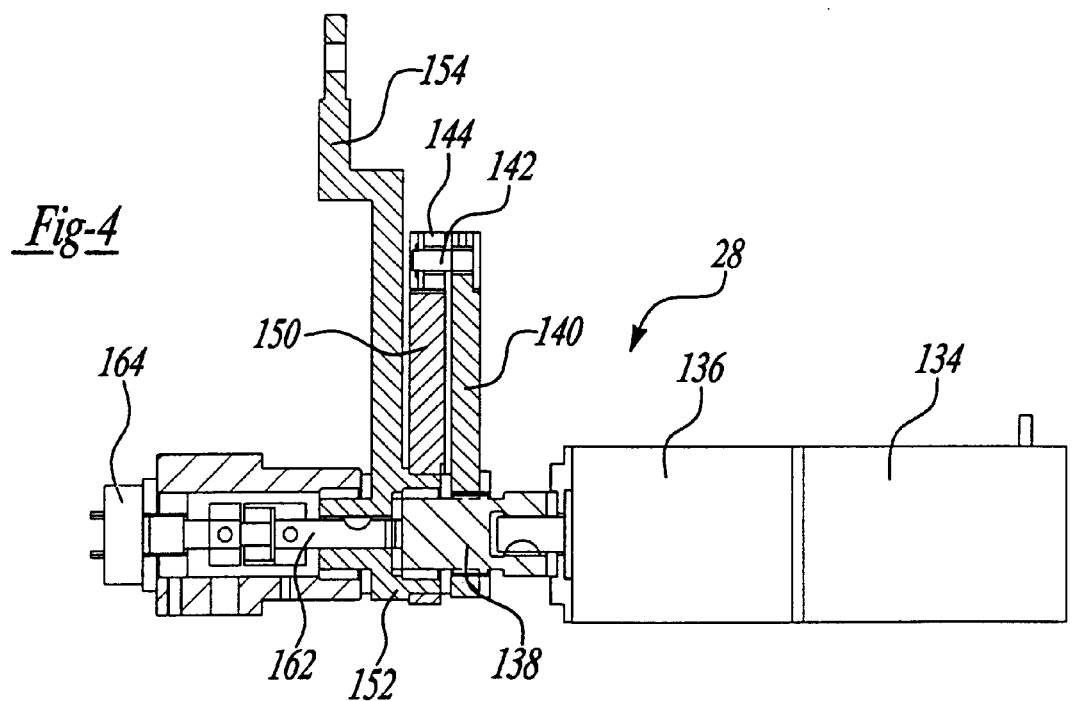
FIG. 4 is a side view of the 2-4-6 hill holder side clutch actuator according to the present invention.
Figure 8:
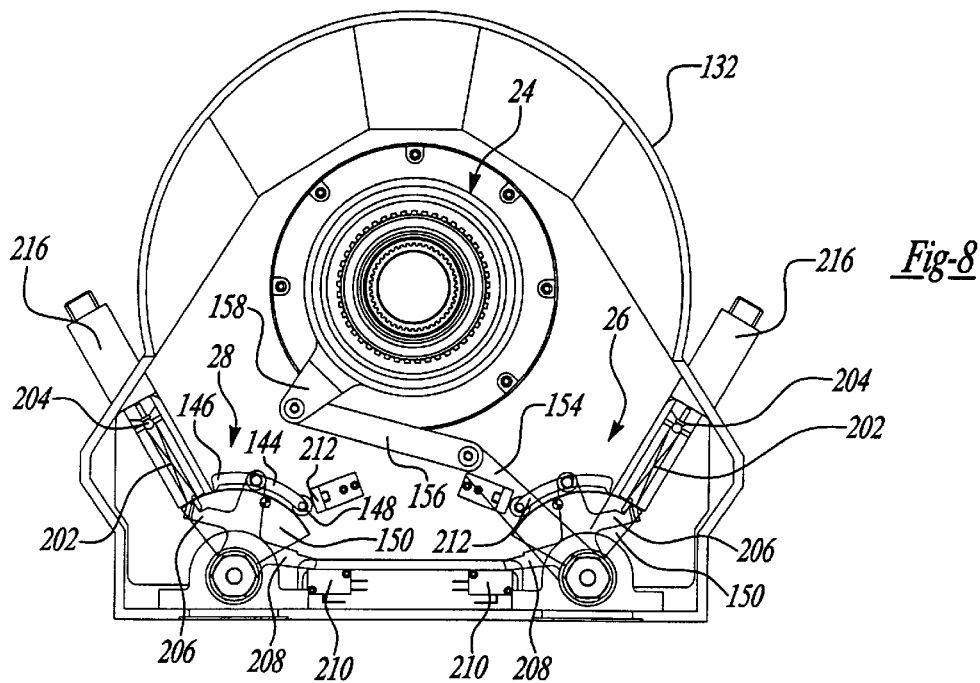
FIG. 8 is an end view of the clutch actuator assembly and dual cam assembly, with the right side clutch actuator in the adjust position.

The first and second clutches 20, 22 are supported within a bell housing 132 by the flywheel 96 along with the dual cam assembly 24 and clutch actuators 26, 28 which are supported by the bell housing 132. The flywheel 96 is supported by the engine output shaft (not shown). With reference to FIGS. 3 and 4, the clutch actuators 26 and 28 will now be described. It should be understood that the left and right side clutch actuators 26, 28 are virtually identical in their construction. Accordingly, a single description with respect to the right and left side clutch actuators 26, 28 will be provided wherein like reference numerals designate common elements. The clutch actuators 26, 28 include an electric motor 134 which drives a planetary reduction gear assembly 136. The planetary reduction gear assembly 136 is provided with a splined output shaft which engages a corresponding splined shaft 138. A pawl teeter arm 140 is mounted to the splined shaft 138 for rotation therewith. A pivot pin 142 is provided in the end of the pawl teeter arm 140. A pawl teeter assembly 144 is mounted to the pivot pin 142 and is provided with a pawl 146 at one end thereof and a roller 148 at a second end thereof, as best seen in FIGS. 7–10. The pawl 146 engages an adjuster plate 150 which is provided with a semi-circular radial outermost surface having a plurality of teeth provided therein. The adjuster plate 150 is mounted to a hub portion 152 of a pivot arm 154. The pivot arm 154 of the right and left side clutch actuators 26, 28 are each attached to a link 156 which is attached to a cam retainer lever 158, 160 of the dual cam assembly 24, as shown in FIGS. 6–10. The pivot arm 154 is provided with a shaft extension 162 which is connected to a potentiometer 164 which measures the position of the pivot arm 154.

Figure 2:
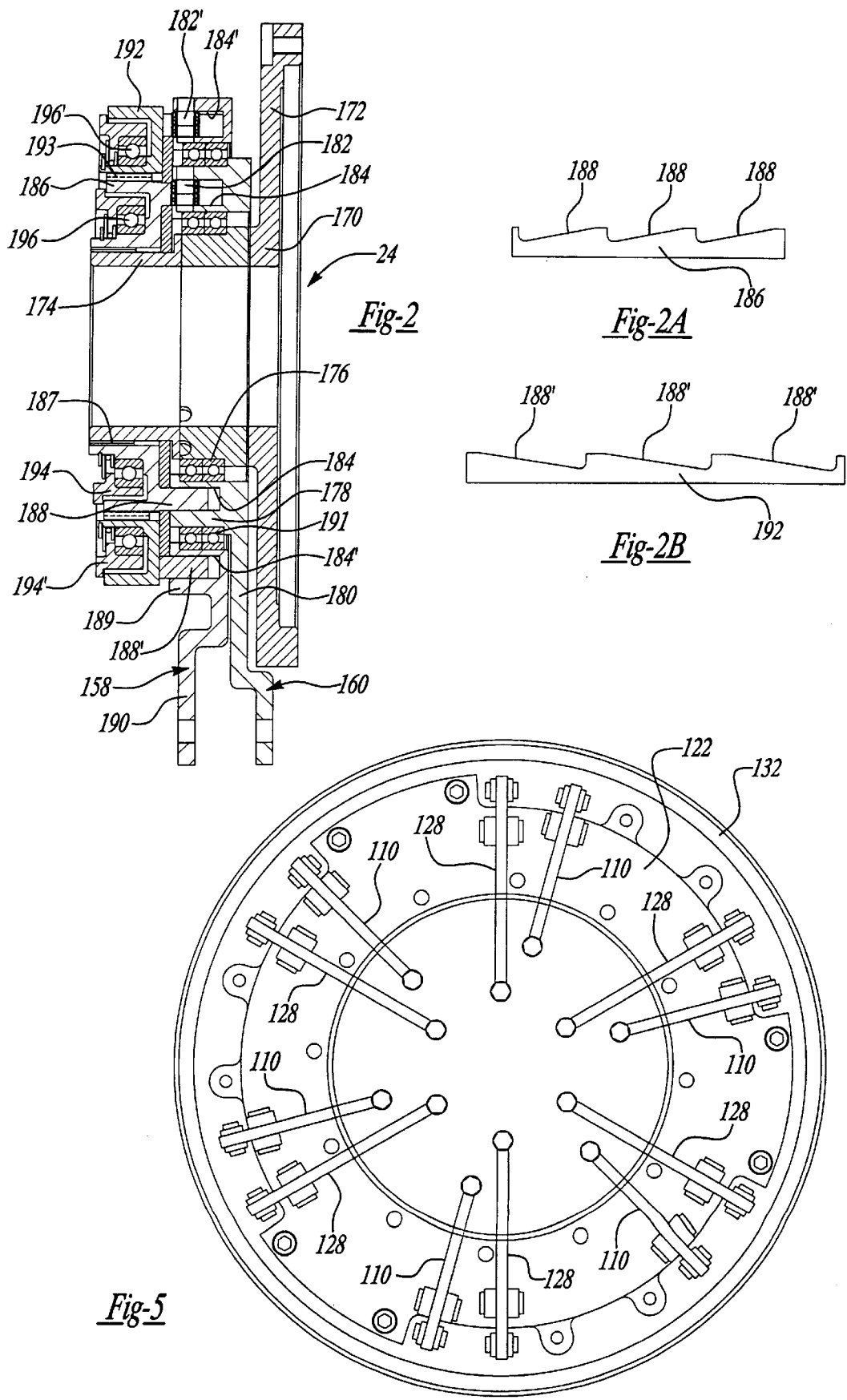
FIG. 2 is a detailed cross-sectional view of the dual cam assembly used for disengaging the dual clutch assemblies according to the principles of the present invention.

As mentioned above, the pivot arms 154 of the right and left side clutch actuators 26, 28 are attached to links 156 which are in turn connected to cam retainer levers 158, 160 of dual cam assembly 24. With reference to FIG. 2, the dual cam assembly 24 will be described in greater detail. The dual cam assembly 24 is provided with a clutch ramp hub 170 which is provided with a flange portion 172 which mounts to the front plate 56 and a cylindrical body portion 174. The 2-4-6 cam retainer lever 160 is rotatably mounted to the cylindrical body portion 174 of clutch ramp hub 170 via a bearing assembly 176. The cam retainer lever 160 includes a ring-shaped body portion 178 and a lever arm portion 180 extending radially therefrom. The ring portion 178 of cam retainer lever 160 supports a plurality of cam rollers 182 along annular groove 184. A cam ring 186 is provided with a plurality of axially extending cam surfaces 188 which engage the cam rollers 184. FIG. 2A provides an illustration of the profile of the cam surfaces 188 of the cam ring 186. In this embodiment, the profile includes three cam surfaces 188 which each correspond to a cam roller 182. The cam ring 186 is slidably connected to the clutch ramp hub 170 by axial splines 187, wherein the rotation of cam retainer lever 160 relative to cam ring 186 causes the cam ring 186 to move axially relative to the clutch ramp hub 170 as the cam rollers 182 traverse against the sloped cam surfaces 188.

The R-1-3-5 cam retainer lever 158 includes a ring shaped body portion 189 and a lever arm portion 190 extending radially therefrom. The ring shaped body portion 189 is provided with a bearing assembly 191 on the radial surface of the 2-4-6 cam retainer lever 160 so that the cam retainer lever 158 can rotate relative to the cam retainer lever 160. The cam retainer lever 158 also supports a plurality of cam rollers 182' along annular groove 184'. Each cam roller 182' corresponds with a sloped cam surface 188' of an outer cam ring 192. FIG. 2B provides an illustration of the profile of the cam surfaces 188' of the outer cam ring 192. In this embodiment, the profile includes three cam surfaces 188' which each correspond to a cam roller 182'. The outer cam ring 192 is splined to the inner cam ring 186 at 193 and is capable of moving axially relative thereto. Upon rotation of the cam retainer lever 158, the cam surfaces 188' move in engagement with cam rollers 182' to cause the outer cam ring 192 to move axially relative to the clutch ramp hub 170. The inner cam ring 186 and outer cam ring 192 are each provided with a cam release pad 194, 194' which is rotatably supported by the inner and outer cam rings 186, 192, respectively, via a bearing assembly 196, 196'. An O ring retainer 198, 198' and a retaining ring 200, 200' are provided for retaining the cam release pads 194, 194' in position relative to the inner and outer cam rings 186, 192. With reference to FIG. 1, the lever 110 of first clutch 20 and lever 128 of second clutch 22 each include an end portion which engage the cam release pads 194, 194' of the dual cam assembly 24. Accordingly, by rotation of cam retainer levers 158, 160 causing axial movement of cam release pads 194, 194', selective disengagement of the first and second clutch assemblies 20, 22 can be obtained.

With reference to FIGS. 6–10, the operation of the clutch actuators for engaging the first and second clutches 20, 22 will be described. As shown in FIG. 6, each of the clutch actuators 26, 28 are shown in the disengaged position. Each clutch actuator 26, 28 is provided with an assist spring 202 which is adjustably mounted at a first end to the bell housing 132 by a ball socket joint 204 and which is connected at a second end to an assist arm 206 which extends from the pawl teeter arm 140, as best shown in FIGS. 7–10. The assist springs 202 can be adjusted via a spring adjustment device 216 which can include, for example, a threaded adjustment apparatus for continuously variable adjustment of the compression amount of the assist spring 202. The pawl teeter arm 140 is also provided with a switch activation arm 208 which engages a switch 210 which shuts off the electric motor 134 of the actuators 26, 28. The assist spring 202 is designed so as to provide an increasing assist force as the pawl teeter arm 140 is rotated from the engaged to the disengaged positions. In other words, as shown in FIG. 7, the spring force of the assist spring 202 acts through the axis of rotation of the pawl teeter arm 140. As the electric motor 134 drives the pawl teeter arm 140, the moment arm upon which the assist spring 202 acts upon the pawl teeter arm 140 increases with the rotation of the pawl teeter arm 140. This can best be seen in FIG. 6 wherein the pawl teeter arm 140 in the disengaged position is rotated so that the assist spring 202 acts on a large moment arm X in order to provide a large assist force. The need for the increasing assist force is due to the increasing spring force of the belleville springs 104 and 120 which bias the pressure plates 102 and 118 of first and second clutches 20, 22, respectively, into the normally engaged position. Accordingly, as the pressure plates 102, 118 are moved away from the engaged position, the force of the belleville springs 104, 120 increases. Thus, in order to consistently reduce the required motor force for disengaging the clutches 20, 22, the assist spring 202 and increasing moment arm arrangement of the present invention provides a consistently increasing assist force.

Figure 9:
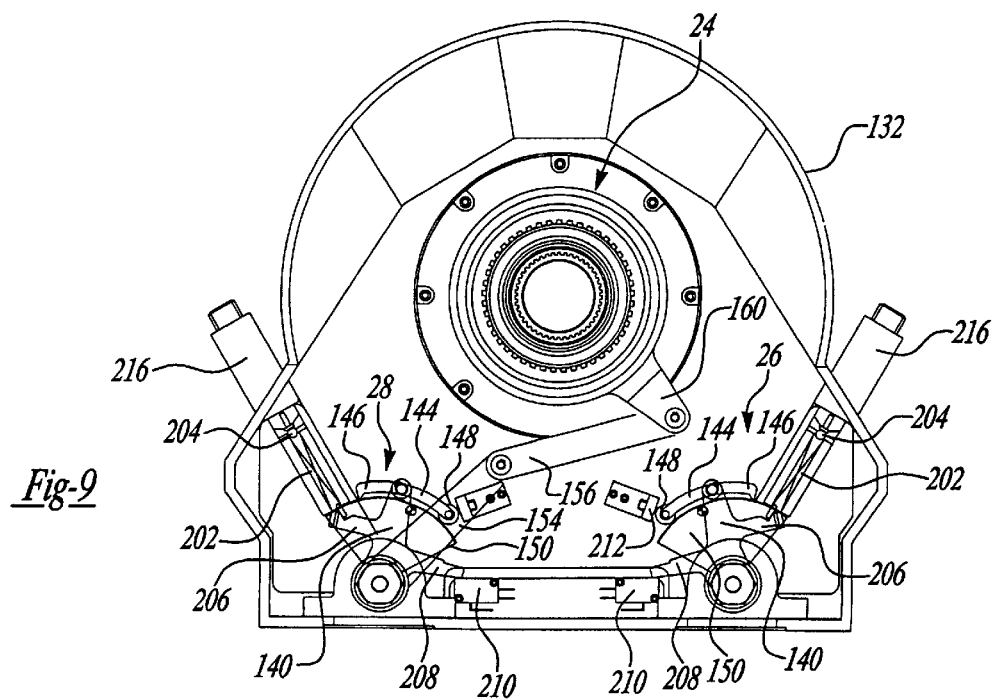
FIG. 9 is an end view of the clutch actuator and dual cam assembly as shown in FIG. 6, with the left side clutch actuator in the disengaged position.
Figure 10:
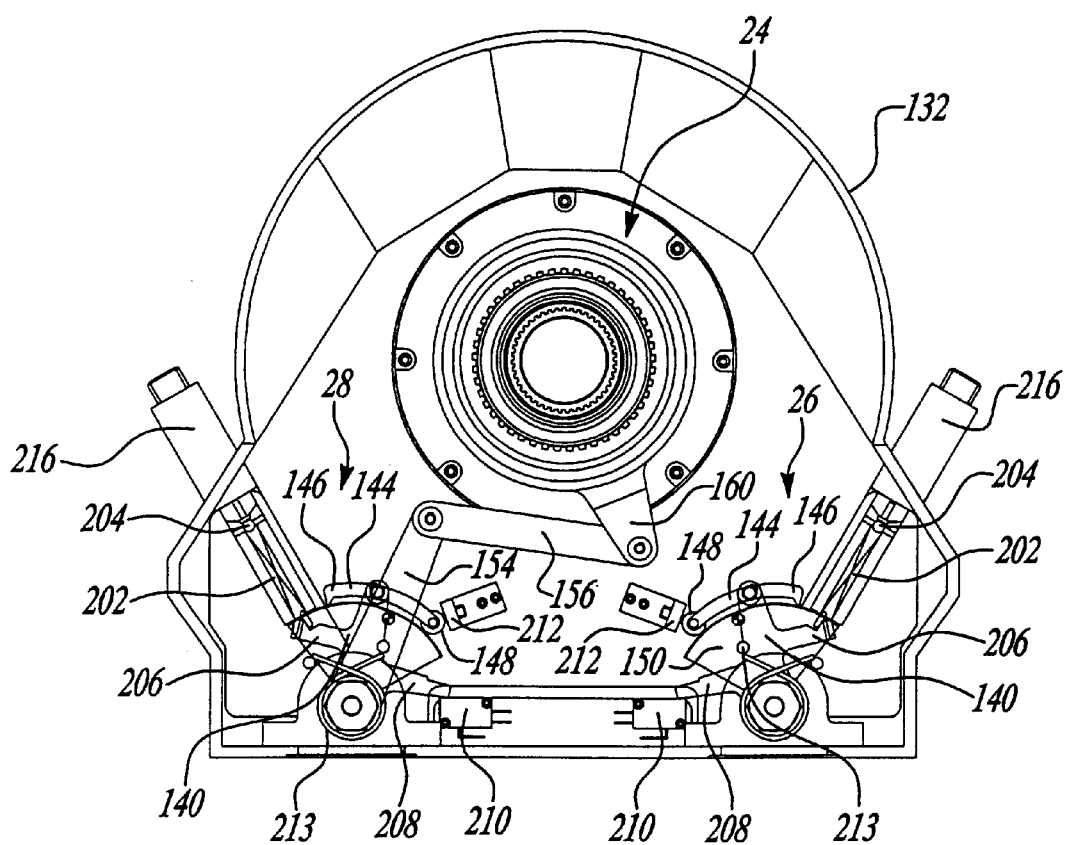
FIG. 10 is an end view of the clutch actuator assembly and dual cam assembly, with the left side clutch actuator in the adjust position.

Upon rotation of the pawl teeter arm 140, the pawl 146 of the pawl teeter assembly 144 transmits torque to the adjuster plate 150 and pivot arm 154 which is mounted for rotation therewith. When the clutch actuators 26, 28 are in the normally engaged position such as shown in FIGS. 7 and 9, respectively, the switch activation arm 208 rests against the switch 210 and the roller 148 of pawl teeter assembly 144 rests against the stop surface 212.

As the clutch discs wear down, the clutch actuators 26, 28 are provided with an automatic adjustment feature wherein as the roller 148 of pawl teeter assembly 144 rests against the stop surface 212, the pawl 146 is allowed to disengage from the serrated teeth of the adjuster plate 150 so that the adjuster plate 150 is free to move relative to the pawl teeter assembly 144. Preload springs 213 are provided to apply a tension force between the adjuster plate 150 and the pawl teeter arm 140 in order to preload the adjuster plate 150 and thus bring the dual cam assembly to the fully engaged position. Accordingly, as the clutch disks wear down, the adjuster plates 150 rotate further as biased by the preload spring 213 during the adjustment in order for the clutch to become fully engaged. Upon subsequent activation of the clutch actuator, the pawl 146 will re-engage with the adjuster plate 150 and the clutch actuator is automatically adjusted to compensate for wear of the clutch disks. Thus, clutch clamp load and torque capacity are maintained. The clutch actuators 26, 28 are mounted to the housing 132 by clutch actuator mounts 214. It should be readily understood to one of ordinary skill in the art that the operation of the left and right clutch actuators 26, 28 is identical and that further description with respect to the left and right clutch actuators 26, 28 is unnecessary in view of this similarity of operation.

Figure 11:
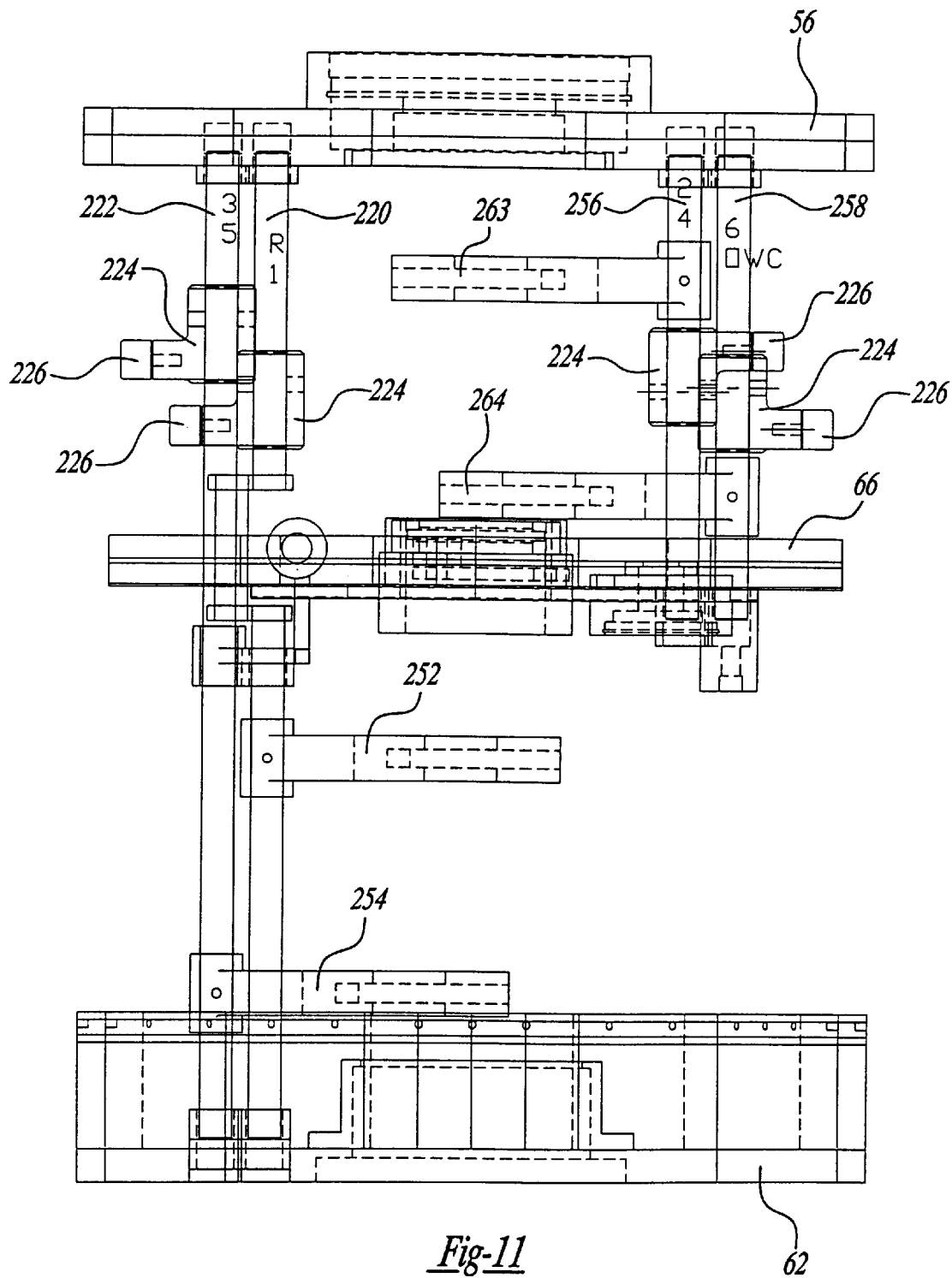
FIG. 11 is a top view of the shift rail assembly according to the principles of the present invention.
Figure 12:
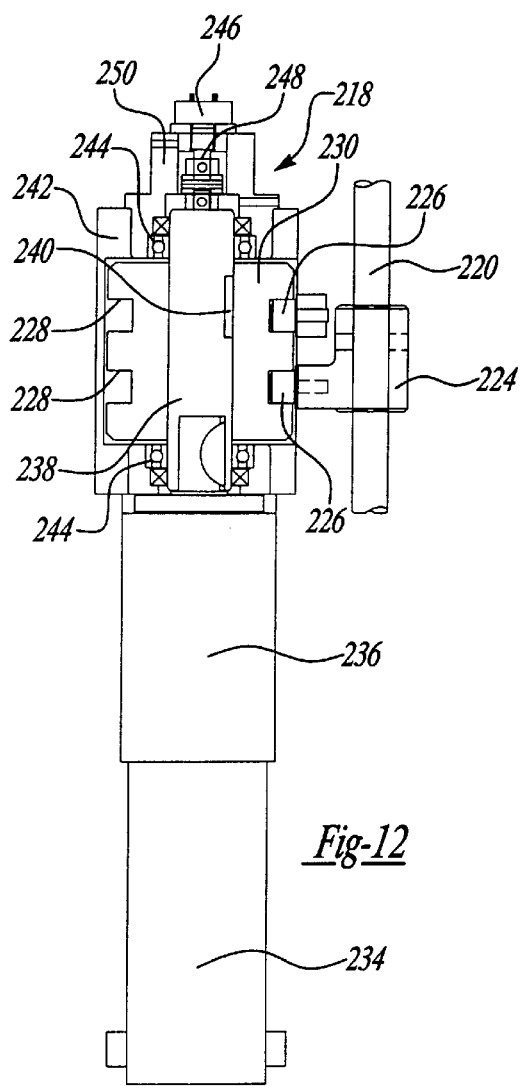
FIG. 12 is a sectional view of the R-1-3-5 shift actuator according to the principles of the present invention.
Figure 13:
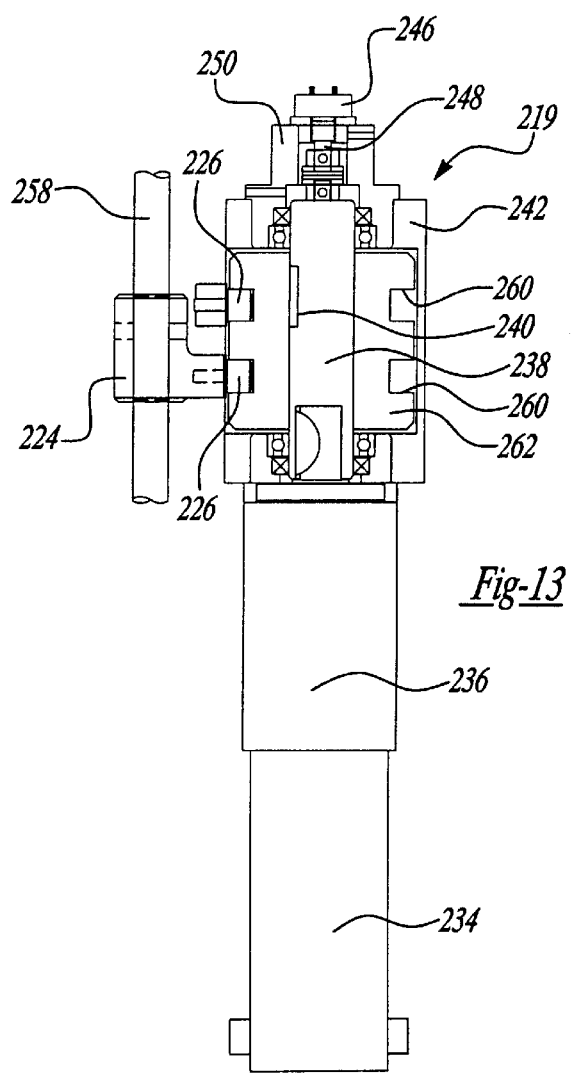
FIG. 13 is a sectional view of the 2-4-6-Hill Holder shift actuator according to the principles of the present invention.
Figure 14:
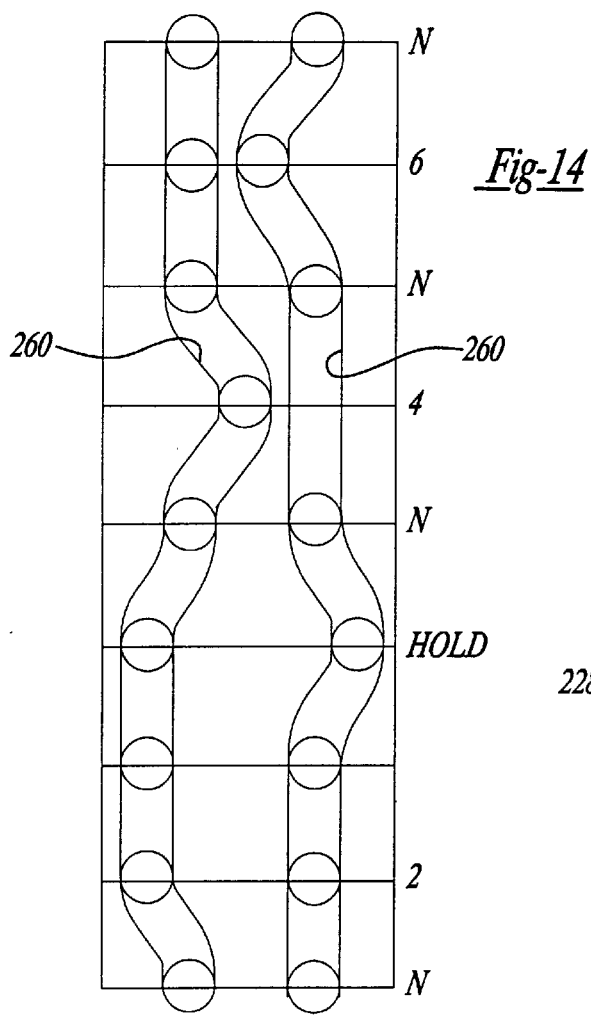
FIG. 14 is an illustration of the cam grooves provided in the 2-4-6-Hill Holder shifter cam according to the principles of the present invention.
Figure 15:
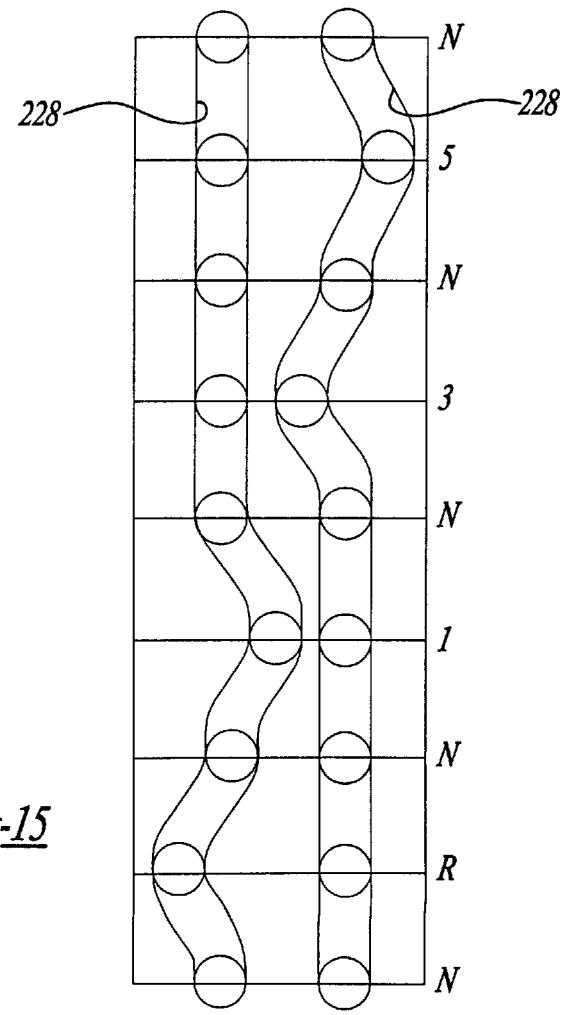
FIG. 15 is an illustration of the cam grooves of the R-1-3-5 shifter cam according to the principles of the present invention.
Figure 16:
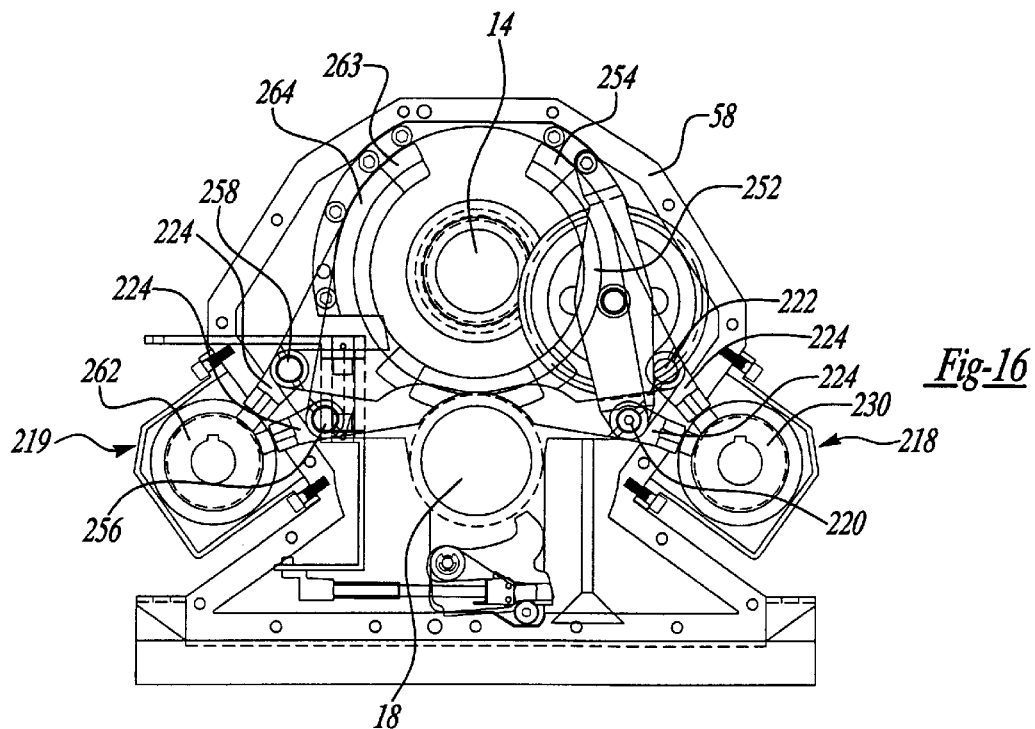
FIG. 16 is an end view of the electromechanical automatic transmission according to the principles of the present invention, with parts removed in order to illustrate the shift actuators, parking brake, and reverse idler gear/lube pump mechanism according to the principles of the present invention.

The shift actuators 218, 219, according to the present invention will now be described with reference to FIGS. 11–16. The electromechanical automatic transmission 10, according to the present invention, is provided with a first shift rail 220 and a second shift rail 222 each provided with a shift lug 224 securely fastened to the shift rails and each having a cam roller 226 (as shown in FIG. 12) which operatively engage cam grooves 228 provided in a barrel-shaped shifter cam 230 of the R-1-3-5 shift actuator 218. The configuration of the cam grooves 228 for the R-1-3-5 shift actuator 218 is shown in FIG. 15. As shown in FIG. 12, the R-1-3-5 shift actuator 218 includes an electric motor 234 which drives a planetary reduction gear assembly 236. The planetary reduction gear assembly 236 drives a shaft 238 which is connected to the shifter cam 230 by a keyway 240. The shifter cam 230 is provided within a housing 242 and is supported by a pair of bearings 244. A potentiometer 246 is provided for measuring the position of the shifter cam 230. The potentiometer 246 is connected to the shaft 238 by a coupler 248 which is disposed within a housing extension 250. The shifter cam 230, upon rotation, drives shift lugs 224 mounted on first and second shift rails 220, 222 for selectively moving the shift rails and thus the shift forks 252, 254 mounted to the shift rails 220, 222, respectively, as shown in FIG. 11. The shift fork 252 is associated with the reverse-first gear synchronizer device 38. The shift fork 254 is associated with the third-fifth gear synchronizer 40.

The electromechanical automatic transmission is also provided with third and fourth shift rails 256, 258, respectively, which are each provided with a shift lug 224 securely mounted to each shift rail 256, 258. Each shift lug 224 includes a cam roller 226 which operatively engage cam grooves 260 provided in the shifter cam 262 of shift actuator 219, as shown in FIG. 13. The cam grooves 260 for the shift actuator 219 are shown in FIG. 14. A 2-4 shift fork 263 is mounted on the shift rail 256 for actuating the second-fourth speed synchronizer 48. A sixth-Hill Holder shift fork 264 is mounted to the shift rail 258 for selectively engaging the sixth-Hill Holder synchronizer 50. With reference to FIG. 13, the 2-4-6 shift actuator 219 has substantially the same construction as the R-1-3-5 shift actuator 218 shown in FIG. 12.

Figure 17:
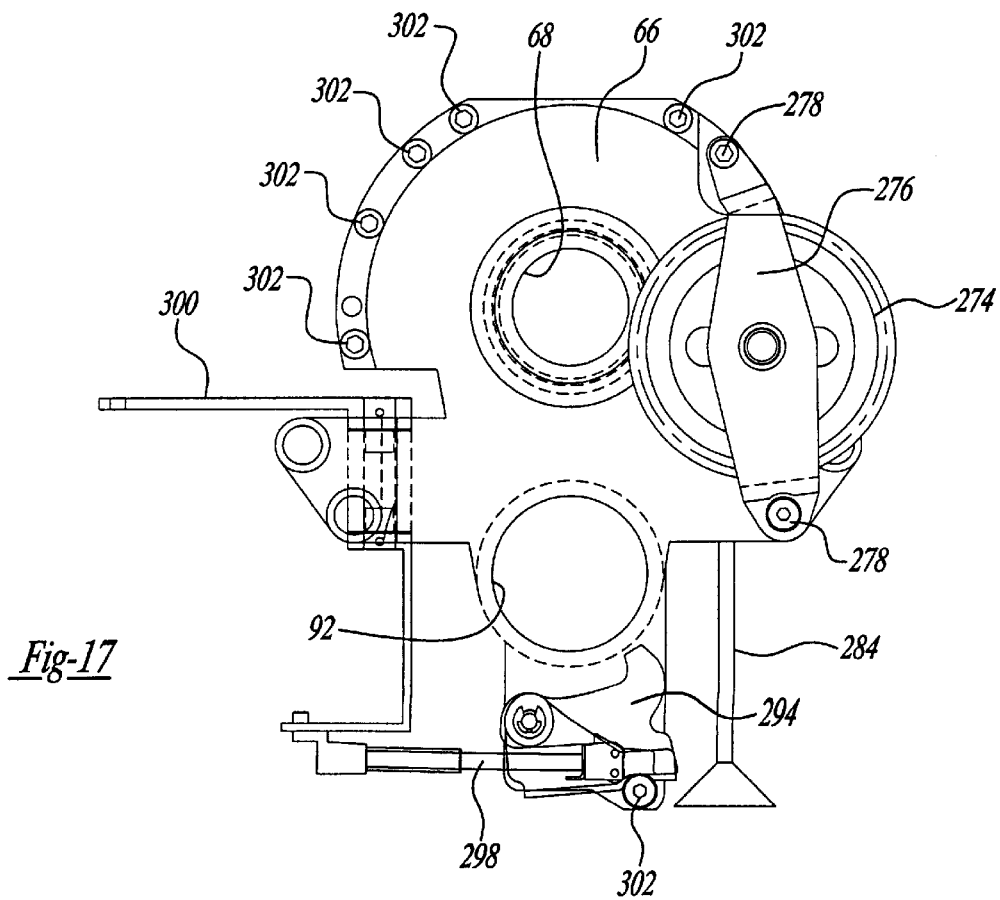
FIG. 17 is a plan view of the center plate with the parking sprag and reverse idler assembly mounted thereto.
Figure 18:
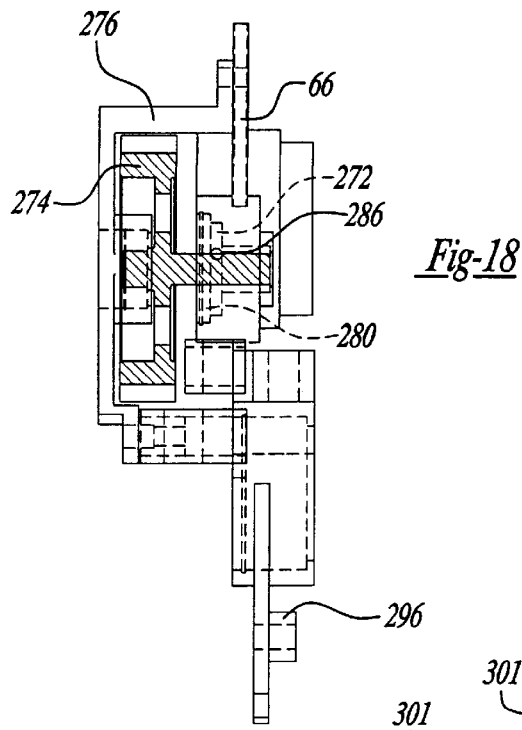
FIG. 18 is a cross-sectional view of the center plate taken through the reverse idler gear/pump mechanism.
Figure 19:
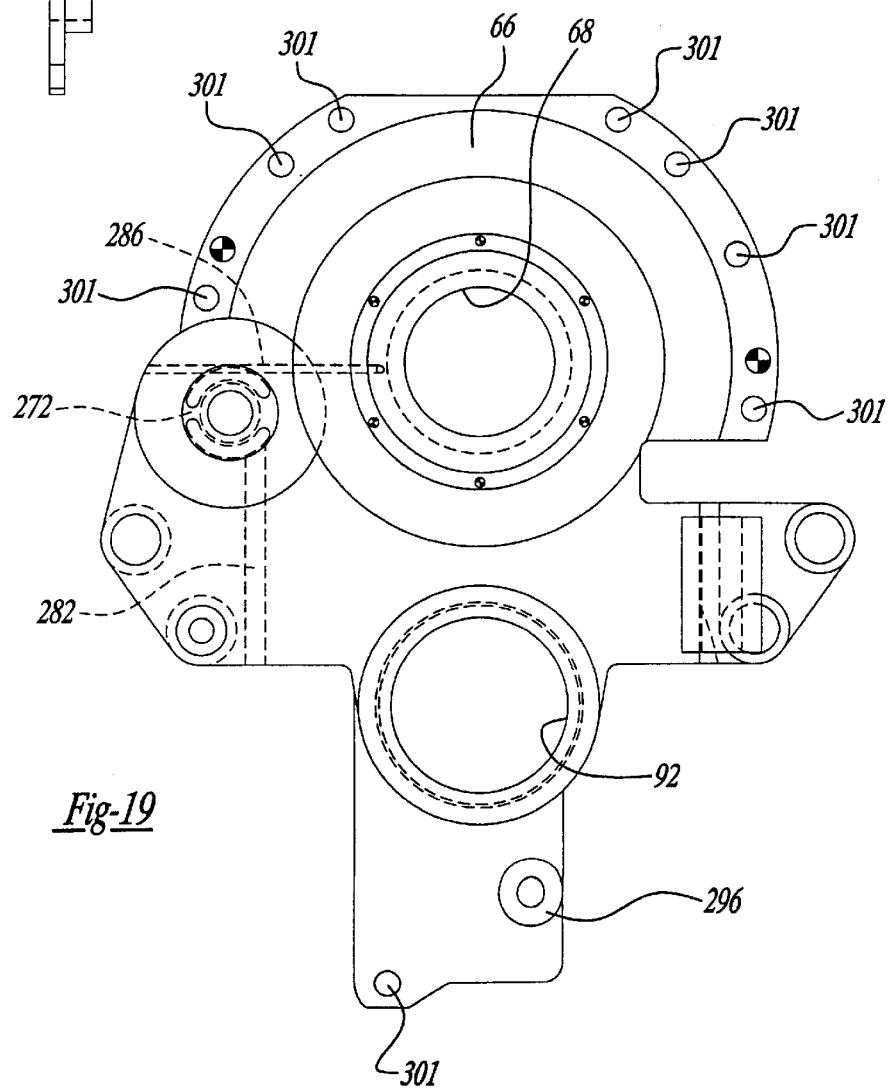
FIG. 19 is a plan view of the front side of the center plate, illustrating the lubrication passages provided therein for communication between the geroter pump and the lubrication passage provided in the first input shaft.
Figure 20:
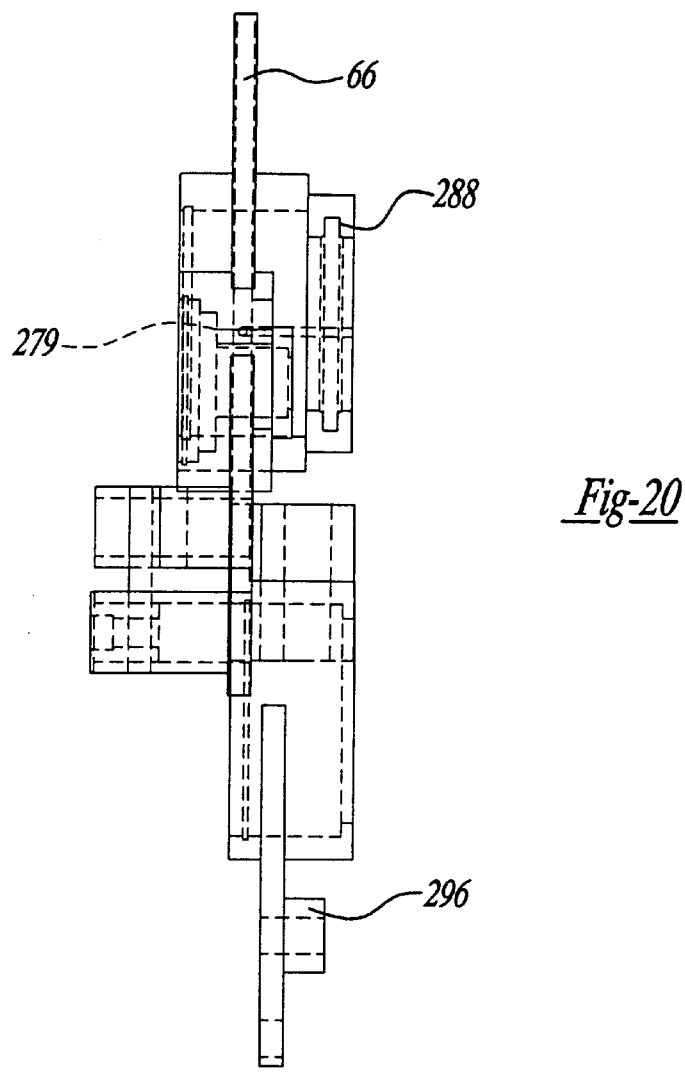
FIG. 20 is a side view of the center plate shown in FIG. 19.
Figure 21:
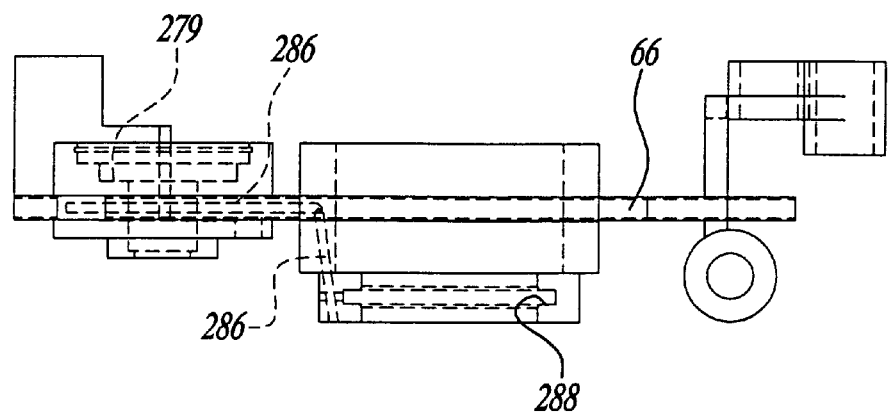
FIG. 21 is a top view of the center plate shown in FIG. 19.

With reference to FIGS. 1 and 17–21, the lubrication system of the present invention will be described. The lubrication system includes a gerotor pump 272 (best shown in FIGS. 18 and 19) mounted to the center plate 66 and driven by the reverse idler gear 274. The reverse idler gear 274 is mounted to the center plate 66 by a mount bracket 276 which is mounted to the center plate 66 by a pair of fasteners 278, as shown in FIG. 17. The reverse idler gear 274 is engaged with the reverse drive gear 30 and reverse driven gear 76. The reverse idler gear 274 is provided with a center shaft 304 which is mounted to the mount bracket 276 and is provided with bearing assemblies 306 for supporting the center shaft 304. The gerotor pump 272 is attached to the center shaft 304 and is provided within a pump chamber 279 and is provided with a cover 280. An oil passage 282 is provided in communication with the gerotor pump 272 and receives oil from an oil pick-up tube 284, as shown in FIG. 17. A second oil passage 286 is in communication with the outlet of the gerotor pump 272 and a lubrication groove 288 which communicates lubrication fluid to a lubrication passage 290 in the first input shaft 14. The first input shaft 14 is provided with radial passages 290a–290g which communicate with the lubrication passage 290 for providing lubrication to the reverse gear 30 and first through sixth gears 32, 42, 34, 44, 36, 46.

A parking sprag 294 is provided for engaging the parking gear 90 provided on the driven shaft 18. The parking sprag 294 is mounted to the center plate 66 by a mount boss 296. The parking sprag 294 is attached to a rod assembly 298 which is attached to a parking lever engagement assembly 300. The center plate 66 is provided with a plurality of mounting holes 301 for receiving threaded fasteners 302 for mounting the center plate 66 to the housing 58.

Figure 22:
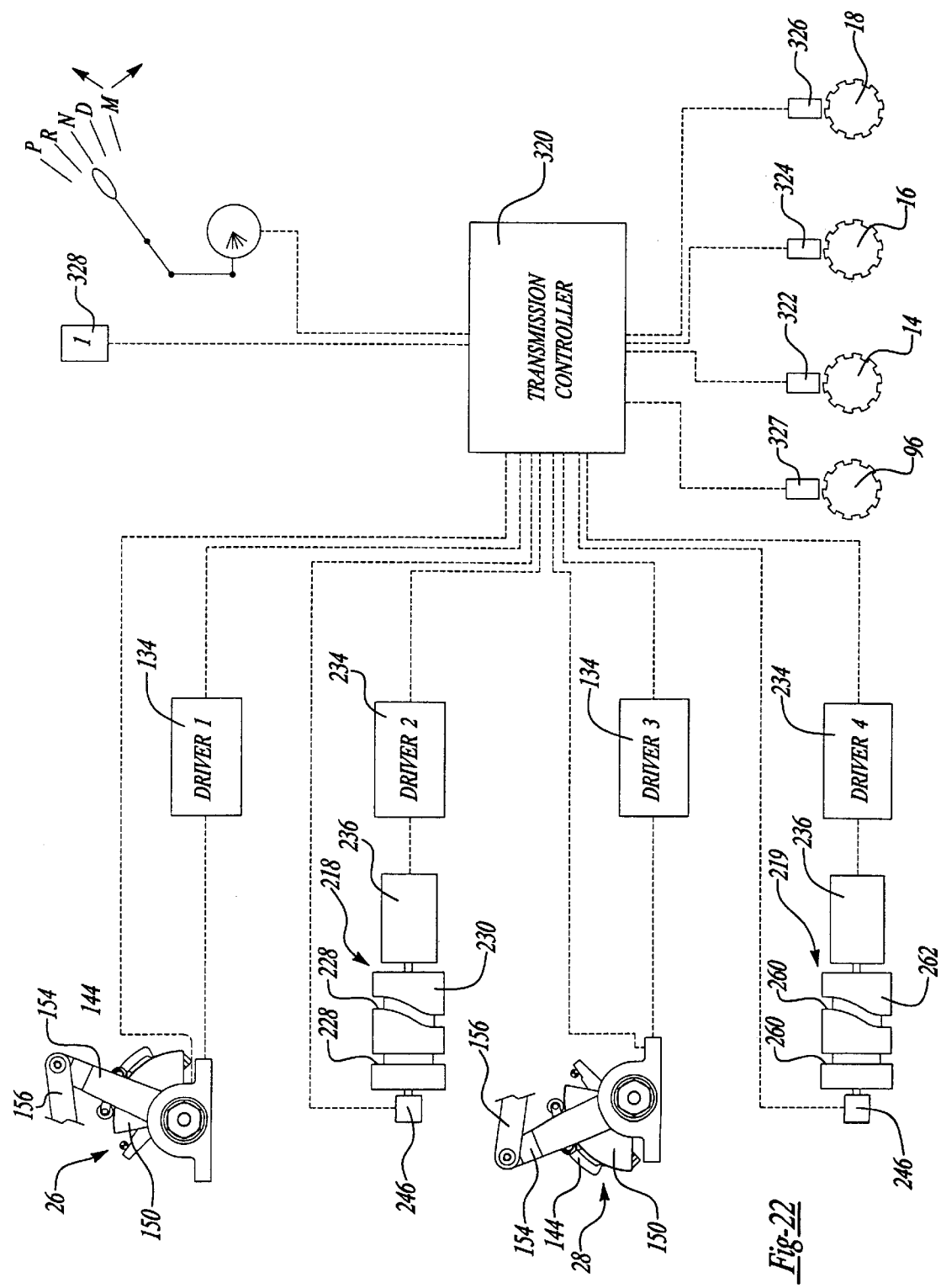
FIG. 22 is a schematic illustration of the control system for the electromechanical automatic transmission according to the principles of the present invention.

With reference to FIG. 22, a transmission controller 320 is provided for operating the clutch actuators 26, 28 and the shift actuators 218, 219. The transmission controller 320 provides signals to the driver motors 134 of the clutch actuators 26, 28 as well as to the driver motors 234 of the shift actuators 218, 219. The transmission controller 320 also monitors the position of the clutch actuators 26, 28 as well as the shift actuators 218, 219 via potentiometers 164, 246, respectively. Uninterrupted power shifting between gears is accomplished by engaging the desired gear prior to a shift event. The transmission 10 of the present invention can be in two different gear ratios at once, with only one clutch 20, 22 being engaged for transmitting power. In order to shift to a new gear ratio, the current driving clutch will be released via the corresponding clutch actuator and the released clutch will be engaged via the corresponding clutch actuator. The two clutch actuators perform a quick and smooth shift as directed by the transmission controller 320 which monitors the speed of the input shafts 14 and 16 via speed an sensors 322 and 324, respectively, as well as the speed of the driven shaft 18 via a speed sensor 326. Alternatively, the controller 320 can determine the speed of the input shafts 14 and 16 based upon the known gear ratio and the speed of the driven shaft 18 as detected by sensor 326. An engine speed sensor 327 is also provided and detects the speed of the flywheel 96. Based upon the accelerator pedal position as detected by sensor 328, the vehicle speed, and the current gear ratio, the transmission controller 320 anticipates the next gear ratio of the next shift and drives the shift actuators 218, 219, accordingly, in order to engage the next gear ratio while the corresponding clutch actuator is in the disengaged position. As a gear is engaged, the corresponding input shaft which is disengaged from the engine output shaft, becomes synchronized with the rotational speed of the driven shaft 18. At this time, the clutch which is associated with the current driving input shaft is disengaged and the other clutch is engaged in order to drive the input shaft associated with the selected gear.

The Hill Holder mechanism 52 is selectively engaged when the transmission is in first, second, or third gears in order to prevent vehicle rollback on a hill when the vehicle is at rest. Accordingly, the transmission controller 320 determines when the vehicle operating parameters are such that the Hill Holder feature is desirable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission having a dual clutch system, comprising:

a first transmission input shaft including a plurality of drive gears mounted thereon;

a second transmission input shaft including a plurality of drive gears mounted thereon, said first and second transmission input shafts being concentric with one another;

a driven shaft having a plurality of gears mounted thereon in meshing engagement with said plurality of drive gears on said first and second transmission input shafts;

a first flywheel adapted to be mounted to an output shaft of an engine;

a first friction disk assembly mounted to said first transmission input shaft;

a first pressure plate adapted to be frictionally engaged with said first friction disk assembly and including a first linkage assembly for disengaging said first pressure plate from frictional engagement with said first friction disk assembly;

a second flywheel mounted to said first flywheel for rotation therewith;

a second friction disk assembly mounted to said second transmission input shaft;

a second pressure plate adapted to be frictionally engaged with said second friction disk assembly and including a second linkage assembly for disengaging said second pressure plate from frictional engagement with said second friction disk assembly.

2. The transmission according to claim 1, wherein said first friction disk assembly includes a central hub adapted to be engaged with the first input shaft of the transmission and said second friction disk assembly includes a central hub adapted to be engaged with the second input shaft of the transmission.

3. The transmission according to claim 1, further comprising a first spring device mounted between said first pressure plate and said second flywheel for biasing said first pressure plate into engagement with said first friction disk assembly.

4. The transmission according to claim 3, further comprising a rear clutch cover disposed adjacent to said second pressure plate and a second spring device mounted between said second pressure plate and said rear clutch cover for biasing said second pressure plate into engagement with said second friction disk assembly.

5. The transmission according to claim 1, wherein said first and second linkage assemblies are driven by electromechanical clutch actuators.

* * * * *